PARAMETRIC AMPLIFIER

Filed May 23, 1961

INVENTOR

Denes Roveti

BY

William Gholman
Lawrence J Field

ATTORNEYS

United States Patent Office 3,243,716

Patented Mar. 29, 1966

3,243,716
PARAMETRIC AMPLIFIER

Denes Roveti, 2801 15th St., Washington 9, D.C.

Filed May 23, 1961, Ser. No. 111,983
8 Claims. (Cl. 330—4.9)

This invention relates to electrical circuits, and, more particularly to high impedance electrical circuits.

One of the more important types of electrical circuits in modern communications systems is that type which is used to match the impedance of one circuit to that of another. Impedance matching circuits are becoming increasingly important as combinations of vacuum tubes, transistors and magnetic cores become more widely used. Impedance matching circuits are used to match a device with a high or a low impedance to one of different impedance to obtain the most efficient and distortionless coupling of energy from one circuit to another. Such matching circuits may be passive or active; they may attenuate or they may amplify. In other words, matching circuits may take many forms and may be used in many situations.

One of the major uses for impedance matching circuits is to provide very high input impedances for systems which are coupled to weak sources of energy. A source of limited energy is usually unduly loaded by any but high impedance circuits. And in those circuits where the variations in the output from the source must be detected, only very high impedance input circuits can follow the changes in the minute currents which may flow. This is becoming increasingly true in modern telemetering systems used to transmit to earth information from millions of miles in space. Because of size and weight limitations, the transmitting equipment used in satellite and space vehicles are of small capacity. As the energy transmitted from the rapidly travelling transmitters passes through space, it is attenuated, and only the most sensitive equipment can detect the signals from these space travelers. In addition to information coming from outer space, the decreased size of the newer data processing equipment and other communications equipment of modern design has increased the need for circuits which can accurately detect and follow variations in minute currents, and do so in a wide range of frequencies.

It is, therefore, an object of this invention to provide new and improved electrical circuits.

It is another object of this invention to provide new and improved high impedance circuits.

It is a further object of this invention to provide new and improved high impedance electrical circuits which have a wide frequency range of response.

Other objects and advantages of this invention will become more apparent as the following description proceeds, which description should be considered together with the accompanying drawings in which.

Figure 1:
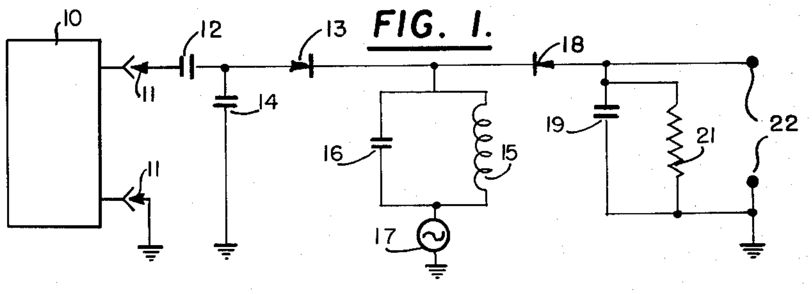
FIG. 1 is a schematic diagram of a circuit according to the principles of this invention.

Referring now to the drawings in detail, and more particularly to FIG. 1, the reference character 11 designates a pair of input terminals to which an input signal source 10, of any suitable type such as disclosed hereinafter, may be removably connected. One of the terminals 11 is grounded, or may otherwise be connected to a common bus, and the other terminal 11 is connected to one side of a capacitor 12, the other side of which is connected to the junction of the anode of a diode 13 and one side of a capacitor 14. The other side of the capacitor 14 is grounded, and the cathode of the diode 13 is connected to the junction of the cathode of a diode 18 and one side of a parallel circuit comprising an inductor 15 and a capacitor 16. The other side of the capacitor 16 and of inductor 15 are connected together and to one side of a source of high frequency energy 17, the other side of which is grounded, also. Connected to the anode of the diode 18 is one of a pair of output terminals 22, the other of which is grounded, and connected across the output terminals 22 are a parallel connected capacitor 19 and resistor 21.

The diode 13 has an extremely high reverse impedance and is biased, through the parallel tuned circuit, by the high frequency source 17. The output from the source 17 is in the neighborhood of 30 megacycles per second, and the time constants in the circuit are such that the capacitor 14 does not have time to discharge completely during the cycle reversals of the energy from the source 17. The current flowing through the circuit, passing through the diode 13 in the direction from the terminals 11 toward the terminals 22, tends to reach a stable value at which it remains with but a small ripple. The input signal, which may be an alternating signal having a frequency of anywhere from 3 cycles per second to 300 kilocycles per second, is applied through a comparatively small capacitor 12 across an equally small capacitor 14. The input is, therefore, a capacitive input. As the input signal applied to the terminals 11 varies, it changes the amount of current flowing through the diode 13 from the source 17, and as the flow through the diode 13 varies, it has the effect of changing the capacitive impedance presented to the input terminals 11.

A slightly different analysis may also be considered. The parallel circuit comprising the capacitor 16 and the inductor 15 at the frequency of the high frequency source 17 represents an inductive impedance which tunes the combined capacitance of the capacitor 14 and the diode 13. As the current flow through the diode 13 changes, its capacitive reactance also changes, modifying the input impedance presented to the terminals 11. If the tuned circuit has a high Q, then a small change in the capacitance of the diode 13 will create a large change in the impedance of the tuned circuit. Thus, in the circuit of FIG. 1, a small input signal presented to a high impedance input circuit can produce a comparatively large change in impedance. The two signals, the low frequency signal applied to the terminals 11 and the high frequency signal generated by the source 17 are illustrated in FIG. 2. Of course, the representation of the two signals is merely for illustrative purposes, and the relative values of both potential and frequency will vary from situation to situation.

Figure 3:
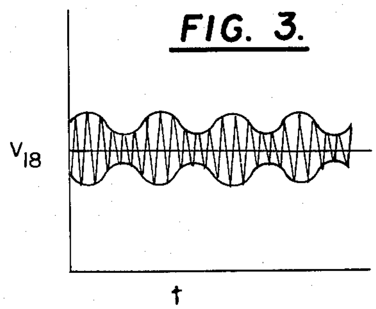

The variation of the input impedance with the value of the applied potential at terminals 11, in effect, modulates the output of the source 17. Since the impedance variation occurs primarily across the parallel circuit of capacitor 16 and inductor 15, the potential shown in FIG. 3 as the wave form of the signal applied to diode 18 is an amplitude modulated wave. The amplitude modulated signal of FIG. 3 is detected by the diode 18 and the capacitor 19 and resistor 21. The output signal at terminals 22 is a reproduction of the input at terminals 11. Since the impedance at the output terminals 22 is that of the detector resistor 21 and capacitor 19, the output impedance of the circuit of FIG. 1 may be of a much lower order than the input impedance. The circuit, effectively serves to match a high impedance input with a low impedance output.

Figure 2:
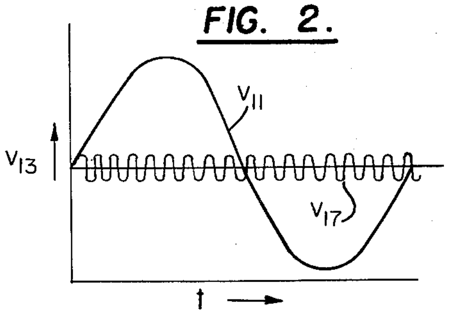
FIG. 2 and FIG. 3 are curves illustrating the wave forms of the potential at prescribed points in the circuit of FIG. 1.

For effective operation of the circuit of FIG. 1, the reverse impedance of the diode 13 must be extremely high. Commercially available semiconductor diodes having leakage currents in the order of $10^{-10}$ amperes and exhibiting capacitance variations with changes in the bias applied to them are suitable for use as the diode 13. Such diodes may be of the 1N482B, 1N456, etc. types. In addition, the capacitance of the capacitor 12 and of the capacitor 14 should be quite small, in the order of $10^{-12}$ farads, and may well be stray capacitance distributed in the input circuit. From this, it can be seen that the input current of the signal applied to the input terminals 11 will be extremely small. The additional advantage of the circuit of FIG. 1 is the power amplification which is obtained by the circuit. An extremely weak signal input results, by the modulation of the energy supplied from the high frequency source 17, in a much stronger signal applied to the diode 18 for detection. In addition, the circuit of FIG. 1 has a wide frequency band, the signal output varies by less than $\pm 3$ db from 3 cycles per second to 300 kilocycles per second.

Figure 4:
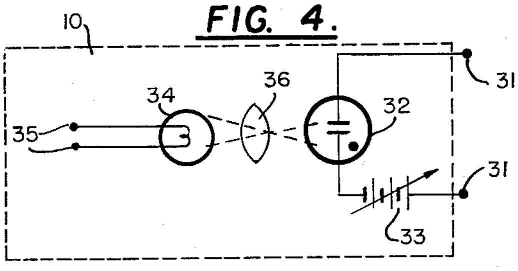
FIG. 4 is a schematic diagram of a light modulated gas glow lamp input for the circuit of FIG. 1.

One example of an input device for the circuit of FIG. 1 is illustrated in the block 10 in FIG. 4, wherein a pair of output terminals 31 are adapted to be connected to the input terminals 11 of the circuit of FIG. 1. The terminals 31 are connected across the series arrangement of a glow tube 32, or other small, two-electrode, gas-filled electron discharge devices such as small neon lamps, and adjustable source of direct current 33. A source of light, shown here as a lamp 34 is energized from a source of alternating energy applied to input terminals 35 and has its radiation focussed upon the glow tube 32 by means of a lens 36 which may or may not be necessary.

A glow tube, when dark, offers an extremely high impedance. Since the gas contained in the tube is not ionized, it acts as a dielectric medium. However, the radiation of the tube with light, or other electromagnetic radiation from an external source ionizes some of the gas contained in the tube in proportion to the amount of the radiation, and the conductance of the tube increases. Thus, the glow tube 32 of FIG. 4 can serve as a radiation detector when used with the circuit of FIG. 1. When the lamp 34 is energized through the terminals 35, and it should be understood that the lamp 34 is only symbolic of any source of radiation, visible or invisible, the conductance of the tube 32 varies in proportion with the amount of radiation striking it. The current flowing from the battery 33, through the tube 32, the terminals 31, and capacitors 12 (which may be short-circuited) and 14 of FIG. 1, varies with the amount of light striking the tube 32 and modifies the current flow through the diode 13 accordingly. This, in turn, changes the impedance of the circuit, and causes an amplitude modulation of the output from the source 17. The amplitude modulated wave is detected by the diode 18, and the capacitor 19-resistor 21 circuit to present a signal at the output terminals 22 which closely follows the pattern of the strength of the radiation impinging upon the tube 32, but amplified. In radiation detectors used upon high speed vehicles weight is important, and the batteries are often the largest and heaviest components in the system. By using a high input impedance circuit such as that shown in FIG. 1, the size and weight of the battery 33 may be very small, since the amount of energy which it must supply is also small and the elimination of a D.C. source of bias from the diode 13 further reduces the size and weight of the energy sources. In addition, a small amount of radiation impinging upon the tube 32 causes a substantial change in the impedance of the tube, rendering the device very sensitive.

Figure 5:
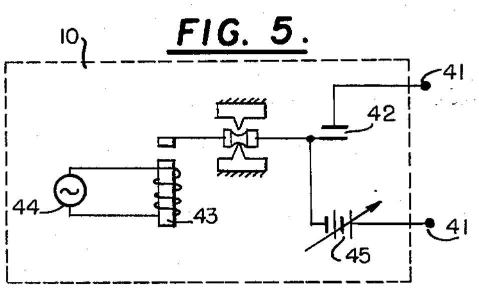
FIG. 5 is a diagram of a vibrating capacitor input for the circuit of FIG. 1.

In addition to the two inputs so far described, the circuit of FIG. 1 may also be used with auxiliary devices to detect and amplify direct current signals. For example, the apparatus of FIG. 5, shown in the block 10 and comprising a pair of output terminals 41 adapted to be connected to the input terminals 11 of FIG. 1, a source of direct current 45 symbolizing any D.C. input, and a vibrating capacitor 42, may be used with the circuit of FIG. 1. When it is used, the capacitor 12 of FIG. 1 may be short-circuited. The vibrating capacitor 42 may be electrically driven by an electromagnet 43 which is energized from an alternating source 44, or it may be a capactor which is mechanically vibrated such as by sound waves in a sound transmission medium. If the system is to amplify direct current signals which vary at an extremely slow rate, then the vibrating capacitor should be driven at a substantially constant rate to transform the direct current into pulsating direct current which may be readily utilized by the circuit of FIG. 1. If, however, the system is used to detect sound or other mechanical vibrations, such as in an underwater system, then the source of direct current 45 should be constant and the capacitor 42 would be vibrated by the signal to be detected. In either case, the capacitor 42 is used to supply a pulsating signal to the input of the circuit of FIG. 1.

The system of the combined FIGS. 1 and 5 operates in a manner similar to that explained above. As the capacitor 42 is vibrated, its plates move with respect to each other and its impedance is changed. The variation in the impedance of the capacitor 42 determines the potential across the plates at any time, and, therefore, the potential supplied from the D.C. source (as exemplified by the battery 45) to the input terminals 11 of the circuit of FIG. 1. The circuit of FIG. 5 operates as explained above. If the vibrating capacitor 42 is driven at a regular rate by a means such as the electromagnet 43, a source of varying D.C. may be substituted for the battery 45. Such a source may be, by way of example, a thermocouple in a system which is to be temperature controlled. By using the system of FIGS. 1 and 5, the thermocouple, or other source of D.C., is not appreciably loaded, can be expected to last longer with less trouble, and give more linear results.

Figure 6:
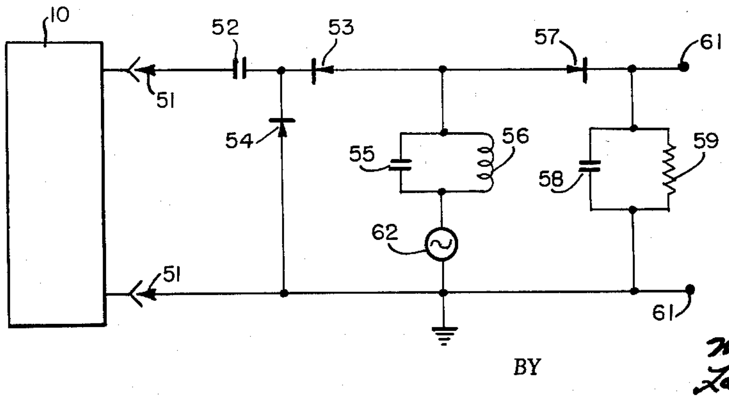
FIG. 6 is a schematic diagram of a balanced circuit embodying the principles of this invention.

A circuit similar to that of FIG. 1 but with a full wave arrangement is illustrated in FIG. 6. A pair of input terminals 51, removably connected to an input circuit 10 such as one of the circuits of FIGS. 4 and 5, has one terminal connected to ground or to a common bus, and the other terminal connected to one side of a capacitor 52 which has a small capacitance. The other side of the capacitor 52 is connected to the junction of the cathodes of two diodes 53 and 54. The anode of diode 54 is connected to ground or to the common bus, and the anode of the other diode 53 is connected to the anode of a detector diode 57, the cathode of which is connected to one of a pair of output terminals 61. The other output terminal 61 is connected to ground or to the common bus. A branch comprising a parallel circuit (having a capacitor 55 in parallel with an inductor 56) in series with a source 62 of high frequency energy is connected between the common bus or ground and the junction of the cathodes of the diodes 53 and 57, and another branch circuit comprising a capacitor 58 in parallel with a resistor 59, is connected from the cathode of the diode 57 to the common bus.

The circuit of FIG. 6 operates in a manner similar to that of FIG. 1 and may be used in the same way and with the same equipment such as that of FIGS. 4 and 5. An input signal from the input circuit 10 is applied to the input terminals 51. As the input signal varies, it changes the current flowing through the diodes 54 and 53. These diodes 53 and 54 are connected in series with the source of high frequency energy 62 and the parallel circuit, so that the source 62 biases the diodes, and the entire circuit is tuned to the frequency of the source 62. As the current through either or both of the diodes 53 and 54 is changed, its, or theirs, capacitive impedance is also changed, and the circuit is correspondingly detuned. Since only a little detuning in a high-Q circuit causes a large change in the impedance of that circuit, changes in the signal strength applied to the input terminals 51 cause substantial changes in the impedance of the circuit. The impedance changes modify the amount of energy flowing from the source 62, and effectively amplitude modulate that energy. The amplitude modulated energy is presented to the diode 57 and the capacitor 58-resistor 59 branch where it is demodulated to recover a signal having the same wave form as the original input signal applied to the terminals 51. However, because of the modulation-demodulation, the output signal is an amplified version of the input signal.

By using the two diodes 53 and 54, the impedance changes are greater than with the use of a single diode. Since the same input signal is applied simultaneously to the same electrode of the two diodes 53 and 54, the same changes in capacitive reactance take place in each of the diodes. The total change in capacitance in the series circuit of the source 62, the parallel circuit, and the two diodes 53 and 54 is about twice the change which would be produced by only a single diode. The entire circuit is then detuned farther from the peak of the tuning curve by an amount which is greater than that produced by only a single diode as used in the circuit of FIG. 1.

This specification has described a new and improved impedance matching circuit which presents an extremely high input impedance to an applied signal and which permits the utilization of input signals having very small strengths and the use of input sources of high impedance. In addition, the circuit of this invention linearly amplifies the small signal applied to its input over a wide range of frequencies, and permits the coupling of the high impedance input to a lower impedance output circuit. The circuit described is simpler in its construction and operation than prior art circuits because of the elimination of a D.C. bias source for the diode, and for the same reasons permits the input impedance to be much higher than that of the prior art. Since it is realized that this specification will suggest to those skilled in the art other forms of using the principles of this invention without distinguishing thereover, it is intended that the invention be limited only by the scope of the appended claims.

What is claimed is:

1. A high input impedance amplifier comprising a source of high frequency energy, an amplitude modulator circuit, means for applying an input signal to said modulator circuit to amplitude modulate the output from said high frequency source, and a circuit for demodulating the output from said modulator circuit, said modulator circuit comprising a semiconductor diode having a high reverse impedance, a parallel circuit connected at one end to one side of said diode and at the other end to one side of said source, a capacitor connected on one side to the other side of said diode and on the other side to the other side of said source and having a value such that the energy from said source charges said capacitor to bias said diode to a point where said diode appears in said amplifier as a capacitor and has an impedance such that the parallel circuit and the diode are together tuned to substantially the frequency of said source, and means for connecting said input signal to said diode to modify the value of its impedance with changes in the input signal.

2. An instrument for detecting variations in radiant energy, said instrument comprising a source of high frequency electrical energy, a circuit tuned to the frequency of said source and connected so that the output from said source flows through said circuit, said circuit including a parallel circuit connected on one side to said source and on the other side to a semiconductor diode biased by said source to a high reverse impedance representative of a capacitance at the operating point determined by the bias, a glow lamp having one side connected to a source of direct current and its other side coupled to said diode, the dark impedance of said glow lamp being modified by changes in radiation striking said lamp, changes in the current flowing through said glow lamp from said source of direct current modifying the bias on said diode to change the tuning of said circuit, and means for connecting to said diode means for indicating changes in the impedance of said tuned circuit.

3. A system for detecting and indicating changes in minute direct currents, said system comprising a first source of high frequency alternating current, a parallel circuit tuned to essentially the frequency of said first source and having one side connected thereto, said parallel circuit having its other side connected to a semiconductor diode reverse biased to a high impedance operating point at which said diode represents a capacitor by energy from said first source, a second source of direct current to be measured, a vibrating capacitor connected between said direct current source and said diode to convert the current to be measured into a pulsating signal for modifying the bias applied to said diode to change the tuning of the tuned circuit in accordance with the strength of the current to be measured and to correspondingly modify its impedance, and means for connecting to said tuned circuit means for detecting the changes in the impedance values of said circuit, which changes are caused by the modifications in impedance of said diode.

4. An instrument for detecting and amplifying small mechanical vibrations, said instrument comprising a source of high frequency electrical energy, a circuit tuned to essentially the frequency of said high frequency source and having one side connected thereto, said circuit containing a parallel circuit in series with a semiconductor diode which is reverse biased by energy from said high frequency source to a high reverse impedance operating point at which said diode appears as a capacitor in said tuned circuit, the tuning of the circuit and the amplitude of its impedance being affected by the bias on said diode, means for connecting to said tuned circuit means for detecting changes in the amplitude of the impedance of said circuit, a source of direct current, a capacitor having one plate subject to small vibrations to be measured, and means for connecting said vibrating capacitor between said direct current source and said diode, whereby changes in the spacing of the plates of said vibrating capacitor change the bias on the diode and the tuning of the circuit.

5. A balanced amplifier having a high input impedance, said amplifier comprising an input capacitor, a source of high frequency electrical energy, a circuit tuned to the frequency of said high frequency source, said circuit comprising a first semiconductor diode connected at one side to said input capacitor and at the other side to one side of a parallel circuit and biased by said high frequency source which is connected to the other side of said parallel circuit to an operating point of high reverse impedance at which the first diode appears in the circuit as a capacitor, a second semiconductor diode with one side connected to said input capacitor and biased by said high frequency source to an operating point of high reverse impedance at which the second diode also appears as a capacitor in the circuit, means to apply an input signal to said input capacitor, and means for connecting to said tuned circuit means to detect the changes in the tuning of said tuned circuit, the changes in the input signal modifying the bias on said first and second diodes to change their impedances and the tuning of said circuit.

6. An amplifier having a high input impedance, said amplifier comprising the series arrangement of a diode biased to appear as a capacitance and a parallel tuned circuit, a source of high frequency energy, a capacitor, said source and said capacitor being connected in series with said arrangement, means to connect a source of input potential across said diode, the high frequency energy from said source charging said capacitor to bias said diode, input potential applied to said diode modifying the bias thereon to vary its impedance and the impedance of the load on said source to amplitude modulate the output from said source, and means connected to said tuned circuit to demodulate said modulated output from said source to reproduce an amplified version of the input potential.

7. A high input impedance amplifier comprising a series arrangement of a semiconductor diode and a parallel tuned circuit, a source of high frequency electrical energy connected to one side of the arrangement, a capacitor connected in series between said diode and the other side of said source, the capacitance of said capacitor being such that the output from said source flowing through said diode charges said capacitor to bias said diode to a high capacitive impedance, said series arrangement being tuned to approximately the frequency of said source, and means to apply a signal potential across said diode.

8. The amplifier defined in claim 7 wherein the application of an input potential to said diode modifies the bias on said diode and the impedance of the series arrangement to amplitude modulate the output from said source, and means for detecting said amplitude modulated energy from said source to derive an amplified version of the signal potential applied across said diode.

References Cited by the Examiner

UNITED STATES PATENTS

| | | | |
|---|---|---|---|
| 1,692,904 | 11/1928 | Potter ____________ | 330—59 X |
| 2,666,816 | 1/1954 | Hunter _____________ | 330—34 |
| 2,917,717 | 12/1959 | Thorsen. | |
| 2,937,341 | 5/1960 | Aram. | |
| 2,981,881 | 4/1961 | Abbott et al. ______ | 330—34 X |
| 2,997,659 | 8/1961 | Abbott et al. _________ | 330—34 |
| 3,105,205 | 9/1962 | Weidknecht et al. ____ | 332—30 |

ROY LAKE, *Primary Examiner.*

NATHAN KAUFMAN, *Examiner.*

T. M. WEBSTER, F. D. PARIS, *Assistant Examiners.*